United States Patent
Oleynikov et al.

(10) Patent No.: US 9,563,499 B2
(45) Date of Patent: Feb. 7, 2017

(54) PROCESSING RUN-TIME ERROR MESSAGES AND IMPLEMENTING SECURITY POLICIES IN WEB HOSTING

(71) Applicant: Parallels IP Holdings GmbH, Schaffhausen (CH)

(72) Inventors: Sergey N. Oleynikov, Novosibirsk (RU); Alexey V. Yuzhakov, Novosibirsk (RU); Stanislav S. Protassov, Moscow (RU); Serguei M. Beloussov, Singapore (SG); Sergey M. Egorov, Novosibirsk (RU); Mikhail M. Lavrentiev, Novosibirsk (RU)

(73) Assignee: Parallels International GmbH, Schaffhausen (CH)

( * ) Notice: Subject to any disclaimer, the term of this patent is extended or adjusted under 35 U.S.C. 154(b) by 173 days.

(21) Appl. No.: 14/609,485

(22) Filed: Jan. 30, 2015

(65) Prior Publication Data
US 2016/0041866 A1 Feb. 11, 2016

(51) Int. Cl.
*G06F 11/00* (2006.01)
*G06F 11/07* (2006.01)
*G06F 17/30* (2006.01)
*H04L 29/08* (2006.01)

(52) U.S. Cl.
CPC ....... *G06F 11/0793* (2013.01); *G06F 11/0709* (2013.01); *G06F 11/0751* (2013.01); *G06F 17/30528* (2013.01); *G06F 17/30867* (2013.01); *G06F 17/30887* (2013.01); *H04L 67/02* (2013.01); *H04L 67/1097* (2013.01); *H04L 67/20* (2013.01)

(58) Field of Classification Search
CPC .................................................. G06F 11/0793
See application file for complete search history.

(56) References Cited

U.S. PATENT DOCUMENTS

| | | | | |
|---|---|---|---|---|
| 7,966,522 B2* | 6/2011 | Fabbrocino | ......... | G06F 11/0793 714/26 |
| 9,069,666 B2* | 6/2015 | Hawkins | ............. | G06F 11/0709 |
| 9,378,014 B2* | 6/2016 | Wilson | ....................... | G06F 8/43 |
| 2003/0192947 A1* | 10/2003 | Toedtli | ............... | G06Q 10/0833 235/376 |
| 2013/0047141 A1* | 2/2013 | Shann | ................. | G06F 11/3664 717/128 |
| 2013/0159989 A1* | 6/2013 | Deckert | .................... | G06F 8/61 717/172 |
| 2015/0169582 A1* | 6/2015 | Jain | ..................... | G06F 17/3053 707/748 |
| 2016/0041867 A1* | 2/2016 | Gokhale | ............. | G06F 11/0709 714/15 |

FOREIGN PATENT DOCUMENTS

RU 2521265 C2 6/2014

* cited by examiner

*Primary Examiner* — Christopher McCarthy
(74) *Attorney, Agent, or Firm* — Bardmesser Law Group

(57) ABSTRACT

A user administers web hosting on user's server from his computer remotely. When a run time error is generated, an error message is sent to a server connected to a knowledge database. If the error matches the known error form the knowledge database, the user is provided an article with a solution to the run-time error. Statistics of occurrence of the errors are saved in the knowledge database. The frequently occurring errors are provided to developers for creating hosting application updates. Additionally, security policies of the user's server can be updated based on the data from the knowledge database.

17 Claims, 5 Drawing Sheets

PROCESSING RUN-TIME ERROR MESSAGES AND IMPLEMENTING SECURITY POLICIES IN WEB HOSTING

CROSS REFERENCE TO RELATED APPLICATIONS

This application claims priority to Russian Patent Application No. 2014132757, filed on Aug. 8, 2014.

BACKGROUND OF THE INVENTION

Field of the Invention

The present invention relates to an error message processing system, and more particularly, to a method and system for processing run-time error messages generated during creation and running of web sites and implementing security policy configurations based on occurrence frequencies of run-time errors.

Description of the Related Art

When applications are executed, various run-time errors can be raised due to errors in an algorithm, OS errors, driver errors, incorrect functions of programmable OS interfaces and developer tools, etc. The run-time errors can result in data corruption and complete or partial data losses. The run-time errors can also result from security configurations exposing certain vulnerabilities. The run-time errors can require system or application reloads.

Typically, application developers implement support for their products based on user feedback in a form of calls, emails to support service, and by having special built-in modules that notify the developers about errors via the Internet. For example, in MICROSOFT WINDOWS if the OS generates errors, a user can click on a help and support menu under the start menu. The main shortcoming of these systems is a lack of anonymity in collection of feedback, which reduces a number of users who actually report errors. This, in turn, reduces the effectiveness of error correction.

Additionally, the conventional error handling systems take a long time for collection of user feedbacks and require a large developing staff for error corrections. Furthermore, conventional web hosting systems do not provide means for changing security policy configurations based on vulnerabilities revealed by frequent errors, if a user prohibits sending error notifications to the server. Another problem is user's unwillingness to reveal his problems and configurations of his system hardware and software to the Internet community.

Accordingly, a method for efficient and inexpensive exchange of information related to system configuration and errors is desired.

SUMMARY OF THE INVENTION

The present invention is related to a method and system for run-time error message processing and generating security policies based on user-dependent information that substantially overcomes the disadvantages of the related art.

A user often needs to improve his computer system functionality due to certain circumstances. For example, a frequency of attacks and effectiveness of intruders on the server increase or a number of server errors becomes critical, and a user needs to know how to deal with a particular error. When a run time error is generated, an error message is sent to a server connected to a knowledge database. If the error matches the known error form the knowledge database, the user is provided an article with a solution to the run-time error. Statistics of concurrencies of the errors are saved in the knowledge database. The frequently occurring errors are provided to developers for creating hosting application updates. Additionally, security policies of the user's server can be updated based on the data from the knowledge database.

However, in order to correct errors and form a security policy, the data related to system hardware and software configuration needs to be known, but a user often does not want to reveal this private information. Thus, the data is encrypted, and when the user receives error correction recommendations, the data is decrypted.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the embodiments of the present invention, examples of which are illustrated in the accompanying drawings.

The present invention is related to a method and system for run-time error message processing. The proposed method reduces time required for error correction. The method improves collection of error reports and reduces a number of developers needed for error correction. If an error is raised, the user receives an instruction for solving the problem, which can be the error itself or its consequences.

Figure 1:
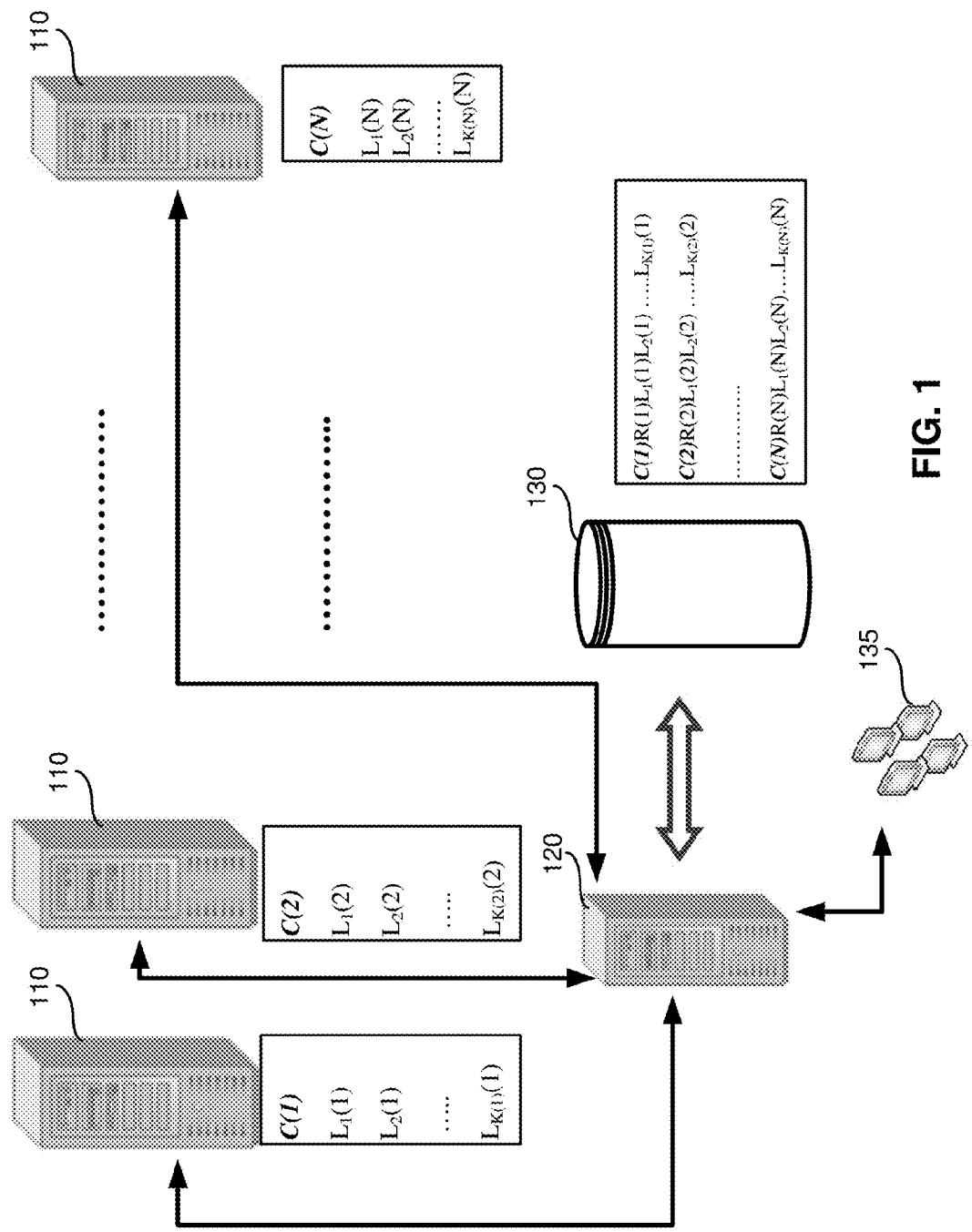
FIG. 1 illustrates a general infrastructure of system, in accordance with the exemplary embodiment.

System architecture for implementing security policy configuration is depicted in FIG. 1. A programmable platform PLESK is intended for implementing web hosting by a user on a user's server 110. When the platform is installed on the user's server, the user can register the product on the developer's server 120.

When new instance of the PLESK platform is installed, for example, a special record with the generated unique ID is created in a knowledge database 140 on the developer's server 120. Other record files are filled with the user contact data and classification of the user's server (dependent or independent). Note that the fields allocated for configurations and security policies are not filled. Instead, these fields are populated later upon a first scheduled server inspection.

Figure 2:
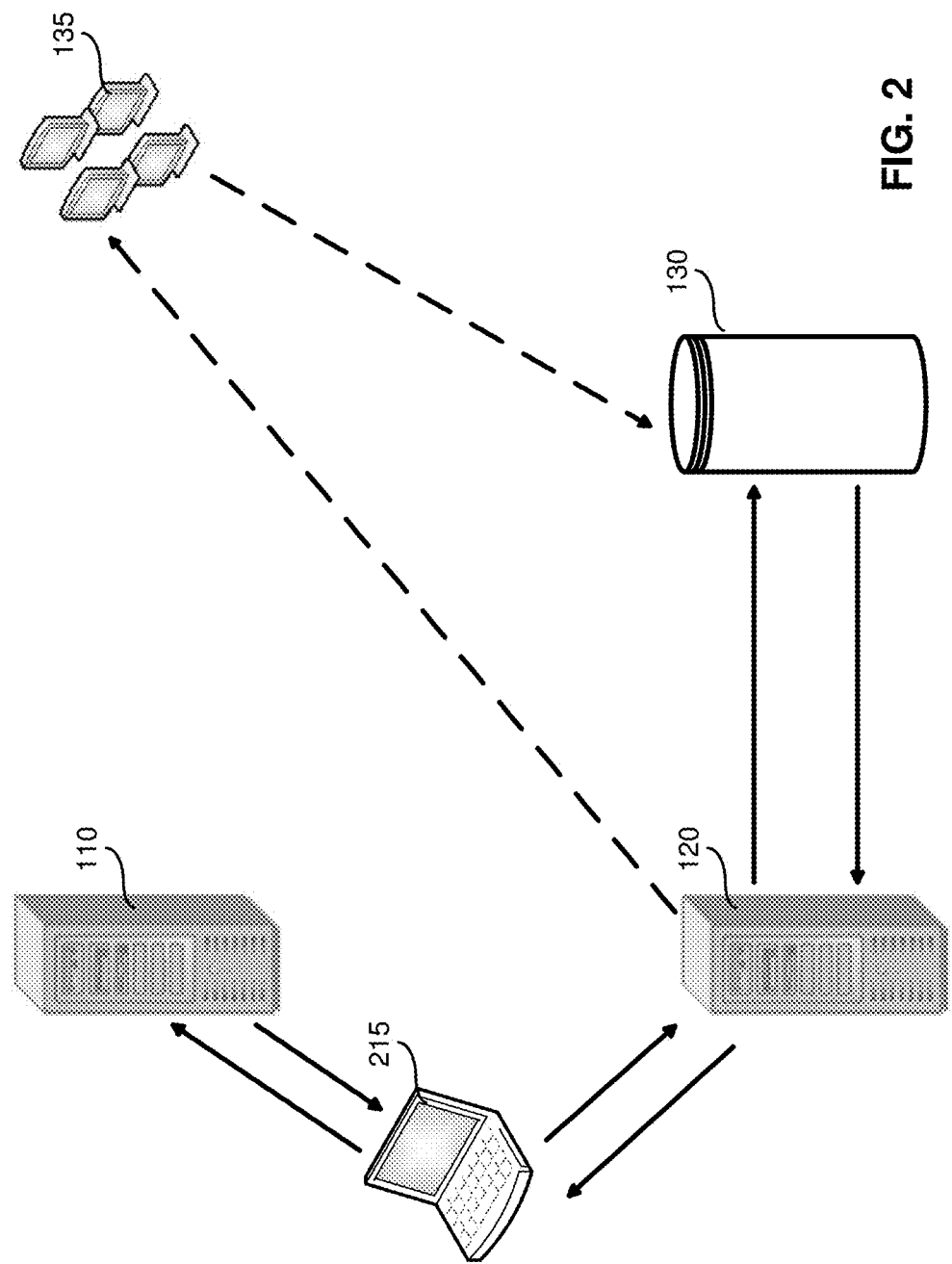
FIG. 2 illustrates system architecture for run-time error messages handling in accordance with the exemplary embodiment.

The record in the knowledge database 130 has special fields for having the flags for indicating how current the security policies are and the flags indicating security risks of a current server configuration and a field for vulnerability rating of the current server configuration as shown in FIG. 2—$C(N)R(N)L_1(N)L_2(N) \ldots L_{K(N)}(N)$. The database 130 contains data for all user's servers with the PLESK platform installed on them. If the vulnerability rating exceeds a threshold, an update of security configurations is recommended. The user sets the configuration and provides the configuration data to the server in the encrypted form and the server provides the recommendations for correcting the error also in the encrypted from. The recommendation can be decrypted on the user side.

The developer can inspect security policies of the user' system based on a service level agreement with provisions regarding a level of access into the user's system. The server reads current configuration of the user's server 110 and configuration of the security policies and provides this data to the developer's server 120. The configuration of the user's server 110 includes a list of installed applications (including third-party applications), data reflecting application versions and a list of application update IDs and patches, application configuration parameters, port configurations (for local network and for the Internet), and options used for launching the applications on a user's server. Note that such inspection does not compromise any user private data.

The OS used on the server is viewed as an application and OS-related data is written into configuration field. C(j) is configuration of user's server j, which includes, for example, version of Web server, maximum transmission unit (MTU), maximum number of possible internet connections, volume of operating memory, a number of processors/processing kernels, etc. Some configuration parameters can be virtual, because users can share one physical server or a cluster of servers. Configuration of the shared software or hardware is known and the private user data is masked by hash (or encrypted) values.

In one embodiment, a user can hide selected configurations in order to protect it from others. In particular, the user can hide his private access to any resource by encrypting this data. If a number of processors does not affect the security policy or error correction procedure, then the user does not need to reveal this data. If a number of processors is critical, the system can provide a recommendation stating that, for example, the error can be fixed by a certain procedure on a four-processor system and by a different procedure on a quad-core processor.

The security policies C(j) of a general server j are represented by a set of limits $\{L_1(j), L_2(j), \ldots, L_{K(j)}(j)\}$, where K(j)—is an aggregated number of limits included into a set of security policies of user's server j. The limits L includes numerical values of parameters of the security policies, parameters and options for launching PLESK services, file names containing launch parameters (key and options) for the PLESK services and the scripts used for initialization of the PLESK services. The security policy can be stored in the knowledge database 130 as $C(N)R(N)L_1(N)L_2(N) \ldots L_{K(N)}(N)$, where R(N) is a vulnerability rating. Knowledge database—a system for storing generic data. The security policies of a particular user are stored in a system registry. Thus, the security policies are hidden from other users.

According to the exemplary embodiment, the monitoring of the security policies of the user's servers is implemented by a monitoring application installed on the developer's server. The developer can access the knowledge base and determine if new errors have been identified. Then the developer can make a decision as to whether to correct these errors as a program code correction or as a system or another settings correction or the error is a result of testing some aspects or reliability by user and doesn't require correction. The monitoring is performed both based on a schedule and upon occurrence of the events related to common security issues. The common security issue is detection of errors in the PLESK platform, in the user's server OS or in third-party applications that are critical to security of the user's server. The monitoring application performs the remote launch of an application on the user's server 110 and receives data reflecting user's server configuration and security policies configurations that are written into the corresponding fields of the database.

Note that the user server (dependent or independent) periodically checks for new configurations. If the server shares common resources with the other servers, the user can simply check how the hoster updated the system. If the server is a standalone or dedicated server, the user is responsible for its configuration. The database contains a record with a rating for the identical configuration and the monitoring application copies the security policies onto the user's server. However, if the configuration is not found in the database, a component-by-component analysis is performed for all installed applications that do not meet common security requirements—i.e., installations of critical OS updates, the PLESK platform and third-party applications. The data reflecting the critical vulnerabilities is stored in the database on the developer's server 120. If the configuration of the user's server does not correspond to common security requirements, a flag is written into an allocated record field and the monitoring application is switched to the local critical mode.

In case of the dependent server, for an identical configuration is performed. If the identical configuration is found in the database, the system checks if the security policies of the user's server are the default security policies. If the security policies of the user's server are the default security policies, the administrator of the user's server (or an administrator of a group of servers) is asked to apply the security policies having the highest rating for a given configuration of the user's server. Note that the actions of the administrator can affect the content of the database at a time of the next scheduled monitoring. Otherwise, the system checks for identical security policies configurations in the database.

If the identical configurations are not found, the security policies are marked as new by writing special flag in a record field. Then, the monitoring application is switched to pushing new security policy configurations mode. If the configuration is not found in the database, a component-by-component analysis is performed for all the installed applications that do not meet common security requirements. If the configuration of the user's server does not correspond to common security requirements, a flag is written into an allocated record field and the monitoring application is switched to the local critical mode.

In the mode for pushing new configurations, the monitoring application finds the security policies that were deemed new at the inspection in the knowledge database.

Then, the monitoring application forms a list of independent user's servers having identical configurations. The administrators of these servers are offered to apply a new set of security policies. If a community agrees, the rating of a given set of policies is increased by 1. If the community declines an offer or a part of the offer, no changes are made.

An online community is a virtual community whose members interact with each other primarily via the Internet. Those who wish to be a part of an online community usually have to become a member via a specific site. An online community can act as an information system where members can post, comment on discussions, give advice or collaborate. In some forms of communities, the members interact using nicknames or other fictional credentials and associating real person or entity data with nickname is not acceptable. An alternative definition of a community can be narrower, for example, all PLESK users who have admin rights for a PLESK control panel, where the admin can be a server owner that has the panel installed, or a hoster or a provider, or another entity that owns more than one server with a control panel. If a panel has multiple users, then they can vote based on server ID, rather than their own personal user IDs.

The database records may have a special field for storing the rating of community members. The rating of the declined offers decreases, for accepted offers increases. The rating can also depend on a correlation between accepted offers and increase or decrease in a number of errors. As a matter of fact some persons can generate a lot of useless or even harmful proposals.

A priority system can be designed for the settings, i.e., "my settings" vs. "foreign settings". A hoster can experiment with particular settings for one server, and then apply them to multiple servers by accepting specific security policies. "My settings" have priority when updating the servers, and their weight increases proportionately to the number of servers that uses them.

A similar system can be used to track the quality of articles in a Knowledge Base. After reading the article, a user can leave feedback, and with enough negative feedback, the article is removed.

Another implementation of the invention is inspection of users' servers even if the error messages are not generated. The procedure described below is used to collect information about registry settings relating to installed applications and other components. This is done anonymously, however, useful data can still be derived from this information. For example, it is possible to determine which hosts are blocked for that particular user, and therefore reach some conclusions about why a particular software component is failing. If a particular application fails only for those users that are permitted access to a particular host, then the failures might be due to a missing update, and the update can be forced. Alternatively, it might be due to installation of a pirated copy of the software. After the data from all servers from the list is collected, the flag indicating new policies is deleted from the database. The monitoring application returns to inspection by scheduled mode and starts the inspection of the next user's server from the database. Thus, after checking and verification, the database can have a flag indicating that this particular server has been verified, and all updates performed. The flag can also reflect the form of the update, e.g., up to version 3.2 or 3.3. Statistical analysis can be used to determine that a particular application that uses very specific settings and function sets leads to an increase in failures, while a different update, on the other hand, leads to a decrease. The "bad" update can be rolled back in that scenario, or forced to update to a next "good" update.

A rating system can be used for updates as well, for example, if the statistical analysis shows that the update is not successful or leads to a high failure rate, the update is marked as a "bad" update, and vendor can remove this update from its list of updates and replace with a better one.

When the monitoring application switches into the local critical mode, a list of user's servers that have a special flag in the corresponding database record is inspected. The configuration of the user's server is read. If the server is dependent, the monitoring application performs update remotely by sending remote commands install patch and update of programmable PLESK platform, OS and third-party applications from corresponding repositories. After the applications are updated, the monitoring application updates security policies remotely and launches the SRCSP service remotely and records the received security policies configurations and clears the flag in the corresponding database field. The monitoring application works in a global critical mode as follows. If a critical vulnerability is detected for a first time and updates or patches are not available, the developer performs analysis of possible prevention of negative consequences and forms recommendations that can include prohibitions for using harmful applications and services, changes in security policies eliminating the possibilities of vulnerabilities exploitation of the user's server. The developer's server's administrator switches the monitoring application to global critical mode. The system detects configurations of user's servers subjected to a given critical vulnerability. The monitoring application generates a list of servers having critical configurations.

The monitoring application inspects each of the servers checking the server configuration one more time in case the server administrator has changed the configuration since the last inspection and removed the application containing a critical vulnerability. If the configuration is critical (vulnerable), recommended actions are performed remotely on the dependent user's server. In case of an independent user's server, the recommendations are sent to the server administrator and the flag is written into a corresponding database field indicating critical configuration. When the list of servers is completed, the monitoring program is switched to an inspection by schedule mode. If an update or a patch is detected in one of the repositories, the monitoring application scans all records related to the user's servers in the database and writes a flag indicating critical vulnerability, if the outdated application is found. Then, the monitoring application is switched to the local critical mode.

FIG. 2 illustrates system architecture for run-time error messages handling in accordance with the exemplary embodiment. According to the exemplary embodiment, the PLESK Panel uses the following algorithm for handling run-time error messages. The PLESK Panel is installed on user's server 110 that are used for web hosting by the users. The users administer the hosting from a remote computer 135 using an Internet browser which displays user interface of the PLESK Panel.

If the PLESK Panel generates a run-time error, a support server 120 receives an original error message from an error processing module. The support server 120 generates a stripped error message by removing user data such as file names and account data. The support server 120 generates two hash values—metaID and messageID. The hash metaID is generated by hashing the file name, method name and code line inside the method. Thus, the hash metaID indicates a place in the application code where the run-time error has occurred.

The hash messageID is generated by hashing a portion of the error message. Note that if a user name is replaced by hash, it is not necessary to notify the server about it. Instead the user name is replaced by alias. The hash messageID can contain a file name and an offset of an operation within the file that generated the error. Thus, the error is linked to the semantics of the application. Hash functions use superposition. Thus, if the file name hash and the offset are known, the hash of the offset can be calculated. The same files can different names within different contexts, but the error will be generated at the same offset with the same offset hash. If the files have different names, but have the same hashes located at a certain address, the files are considered to be identical.

An example of forming a stripped error message and generation of the hashes is provided below.

First phase—receiving an original error message: usunable to create subscription with GUID

```
abcd3443-3443-abcd-3443-abcd3443abcd: error during execution util
/usr/local/psa/admin/sbin/domainmng    --name   test.com
--ip-address
10.50.1.2
```

Second phase—generating stripped Error Message.

```
_getStrippedMessage:
Error: usunable to create subscription with GUID *guid*: error during
execution util /*psa*/admin/sbin/domainmng-name test.com --ip-
address*number*.*number*.*number*.*number*
```

The method _getStrippedMessage processes the text of the run-time error message. Several methods for generation of the stripped error message from the original error message can be used with different types of errors.

Third phase is calculation of the messageID. A text string produced at the second phase is processed by using the hash function MD5 (for example), which provides a high probability of no collisions for two different original messages. The messageID is calculated as follows:

```
public static function getMessageId($message)
    return md5(self::_getStrippedMessage($message))
;
```

Fourth phase—calculation of metaID. If the error occurred in an independent function, the name of this function is used $traceStep['function']

If the error occurred in a class method, the string produce by concatenation of a class name, a type of exception and a class method is used:

$traceStep['class']. $traceStep['type']. $traceStep['function']

In order to produce the text string, the name of the application file, where the class method generated an error is located are concatenated:

```
$fileInfo =
    isset($traceStep['file']) ? basename($traceStep['file']) : '';
```

The hash function value (i.e., MD5) is calculated for the resulting string in order to produce metaID. An exemplary code for calculation of metaID is provided in Appendix i.

According to the exemplary embodiment, the error handling module uses getStrippedMessage function for generating a stripped error message from the original message. The code for the getStrippedMessage function is provided in Appendix ii.

Then, the server 110 sends a message to the user computer 215. The message appears in a browser window and notifies they user of a run-time error. The message also contains a link for a support site located on the support server 120. Alternatively, a system error message can appear on user computer 215 over all other displayed windows. When the user moves by the link to the support site, the server 110 sends the stripped error message, hashes metaID and messageID to the user computer 215, which sends them to the support server 120.

According to the exemplary embodiment, the server 120 has an application supporting the knowledge database 130 containing run-time errors data. The knowledge database 130 contains articles describing methods for handling consequences of the particular error, which had occurred in the past and for which the support team had found a solution. The support link takes the user to an interface of the knowledge database 130. A hash table of an error message can be used as a part of the knowledge database 130 or as a local table on a user side. If errors of a certain type can be corrected by changing application data that is not reflected in the error message, but the error notification with a required hash had been received from the user before, this hash can be used in the error handling recommendation.

Thus, the hash table can be stored on the server as well as on the user side. The knowledge relational database 130 contains user-specific data apart from generic error data. The error description is stored in a form of a hash. If the error hashes are different, this means that the errors have occurred in different modules or reported by different users. If the hashes are the same, it means that the user keeps ignoring the errors. A message like "Please correct errors!" can be sent to this user. Thus, the exemplary embodiment collects statistics for individual users and for the entire community. If only one user encounters a particular error, this error does not need to be corrected globally.

The server 120 searches the knowledge database 130 by two keys—the metaID and the messageID. If required articles are found, they are sent to the user computer 215. If the articles are not found, the search is performed by only the metaID. If the articles are found, they are sent to the user computer 215. Otherwise, the search is performed by the messageID. If no article is found, the full text search is performed by the key stripped error message.

If the articles are not found, it means that the error had not occurred before and the user is asked to describe his actions and reaction of the PLESK Panel interface by filling a support ticket. If the articles provided to the user do not solve the problem caused by the run-time error, the user can also fill an error ticket. The ticket can be filled using any format. The stripped error message and hashes metaID and messageID are added to the ticket automatically. A special component is responsible for managing the tickets. The tickets can be generated by the knowledge base control system based on number of errors and the error occurrence frequency.

The articles are sent to the user browser window and the ticket can be filled using this window as well. The server 120 adds error-related data to the statistics database, which is a part of the knowledge database 130. The statistics of notifications of problems with the same hash values of the metaID and the messageID are collected. The statistical database allows for determining a frequency of run-time errors and effectiveness of the solutions provided. If all users send the same notification of errors with the same frequency, then the server software or hardware needs to be inspected. If the users' processor loads are different, but notifications of the same error are received with the same frequency, the problem is, most likely, in the server hardware or in the common server software, which is active even when the user is not.

If notifications of a particular error are received from all users once, the method of removing an error is effective and can be applied to all user's servers. A support group 135 selects the most frequently occurring errors, analyses user support tickets and comes up with recommendations for handling the run-time error and places the recommendation into the knowledge database. Then, the support group provides the data to the developers' group for solving the issues in the next release of the application. If an error is critical and the consequences are significant, the developer's groups can be notified at the same time as the recommendation is generated.

The use of hash values metaID and messageID allows for identifying of a location of a run-time error and the cause of the run-time error in the application. Also, it assists the users in finding the solutions to the run-time errors faster.

Figure 3:
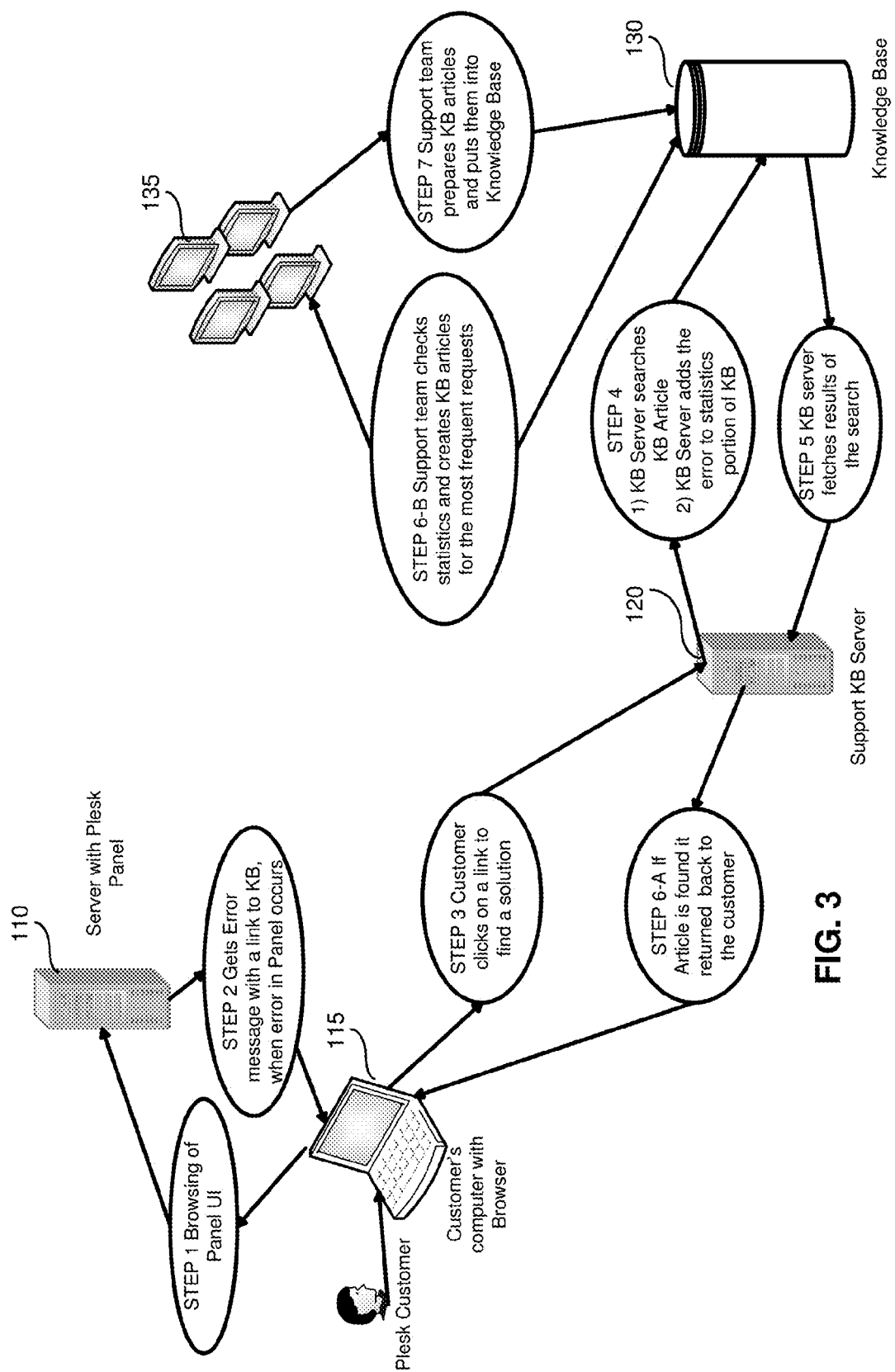
FIG. 3 illustrates a workflow of an error messages handling system, in accordance with the exemplary embodiment.

FIG. 3 illustrates a workflow within the error handling system, in accordance with the exemplary embodiment. In step 1, a user browses PLESK Panel interface of the server 110 from his computer 115. In step 2, the user receives an error message with a link to a knowledge base when the error occurs in the PLESK Panel on the server 110. In step 3, the user clicks on the link to find a solution to the error. Then, in step 4, the server 120 searches for an article in the knowledge database 130, and the server 120 adds error-related data to statistics portion of the knowledge database 130.

In step 5, the server 120 fetches the search results from the knowledge database 130. In step 6-A, the error-related article is found and returned back to the user 115. In step 6-B, the support team 135 checks statistics and creates knowledge base article for the most frequent requests. In step 7, the support team 135 prepares knowledge base articles and puts them into the knowledge database 130.

Figure 4:
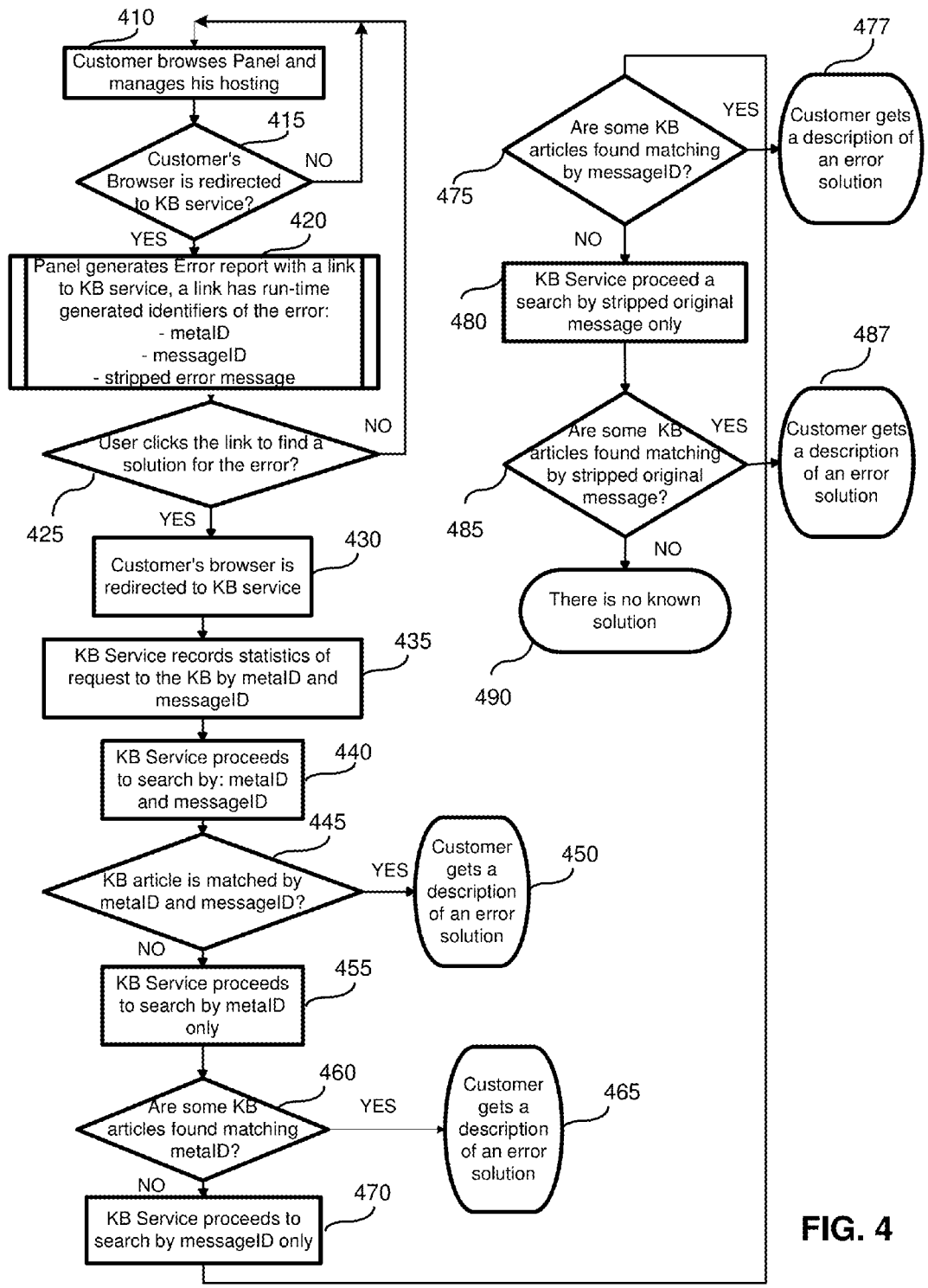
FIG. 4 illustrates a flow chart of the error messages handling method, in accordance with the exemplary embodiment.

FIG. 4 illustrates a flow chart of an error messages handling method in accordance with the exemplary embodiment. In step 410, a user browses a hosting PLESK Panel and manages his web hosting on a server remotely. If in step 415, the user browser is redirected to a knowledge base service, the PLESK Panel generates an error report with a link to knowledge base service in step 420. The link error identifiers are messageID, metaID and a stripped error message. Otherwise, the user continues to browse the PLESK Panel in step 410. If, in step 425, the user clicks on the link to find a solution for the error, the user browser is redirected to the knowledge base service in step 430. Otherwise, the user stays without a solution.

In step 435, the knowledge base service records statistics of the request to the knowledge database by the metaID and the messageID. In step 440, the knowledge base service searches the article by the metaID and the messageID. If the article is found, in step 460, the user receives an article for error solution in step 450. Otherwise, the knowledge base service performs a search by the metaID only. If an article matching the metaID is found in step 460, the user receives an article for error solution in step 465. Otherwise, the knowledge base service performs a search by the messageID only.

If, in step 475, an article matching the messageID is found, the user receives an article for error solution in step 477. Otherwise, the knowledge base service performs a search by the stripped original message only in step 480. If the article matching the stripped message is found in step 485, the user receives an article for error solution in step 487. However, if no matching article is found, there is no existing solution (step 490).

Figure 5:
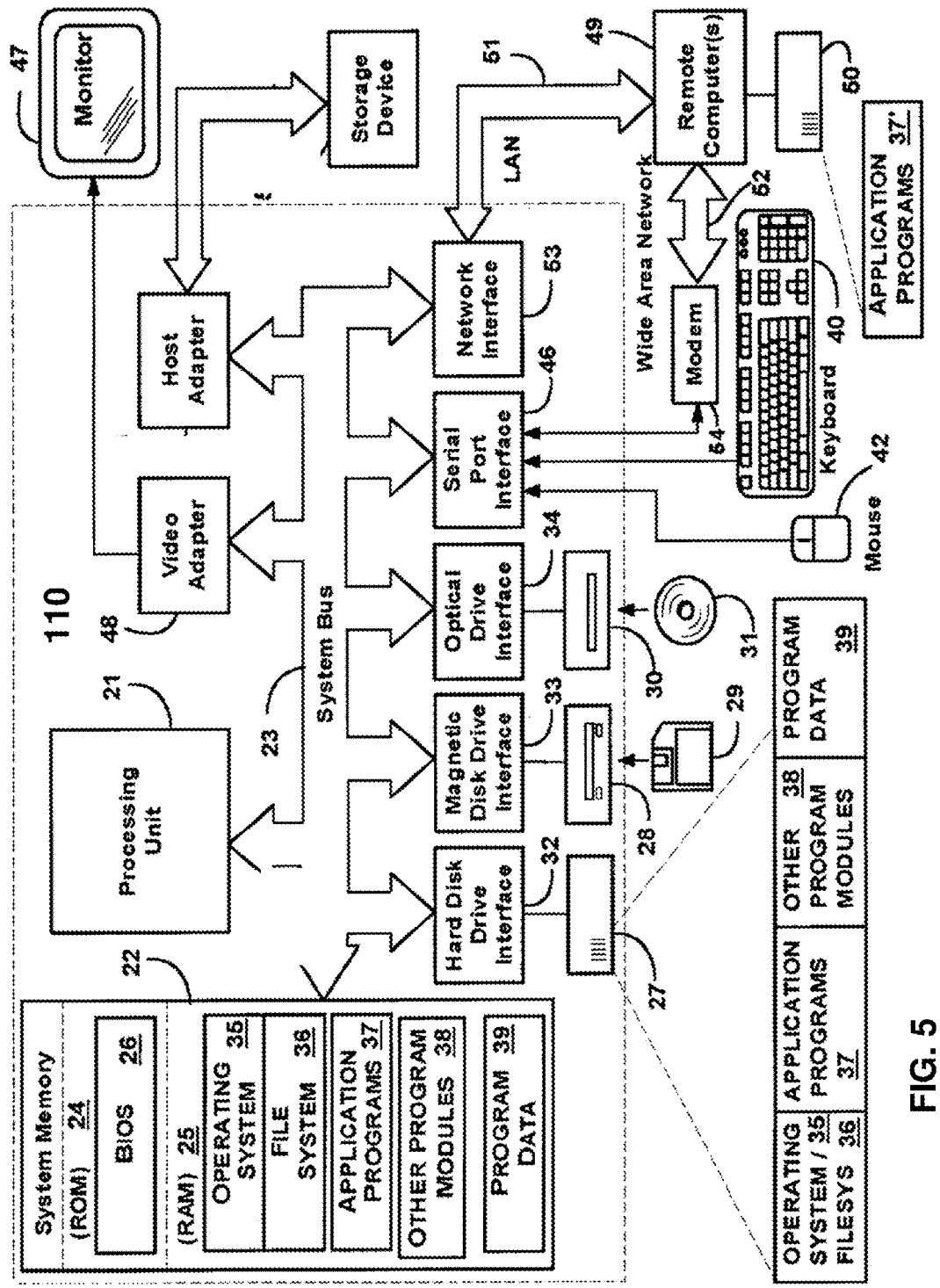
FIG. 5 illustrates a schematic diagram of an exemplary computer or server that can be used in the invention.

With reference to FIG. 5, an exemplary system for implementing the invention includes a general purpose computing device in the form of a host computer or server 110 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the host computer 110, such as during start-up, is stored in ROM 24. The host computer 110 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the host computer 110.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The host computer 110 includes a file system 36 associated with or included within the operating system 35, such as the WINDOWS NT™ File System (NTFS), one or more application programs 37, other program modules 38 and program data 39. A user may enter commands and information into the personal computer 110 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 110.

The computer 110 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 110 is connected to the local area network 51 through a network interface or adapter 53. When used in a WAN networking environment, the computer 110 typically includes a modem 54 or other means for establishing communications over the wide area network 52, such as the Internet. The modem 54, which may be internal or external, is connected to the system bus 23 via the serial port interface 46.

In a networked environment, program modules depicted relative to the host computer 110, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the method and system provide for efficient run-time error handling requiring less resources.

It should also be appreciated that various modifications, adaptations, and alternative embodiments thereof may be made within the scope and spirit of the present invention. The invention is further defined by the following claims.

APPENDIX i

```
public          static          function          getErrorMetaId($error)
{
    $metaIdParts = array(
        basename(is_array($error) ? $error['file'] :
$error->getFile( )),
        is_array($error) ? 'Error' : get_class($error),
    );
    if ($error instanceof Exception) {
        $trace = $error->getTrace( );
        foreach ($trace as $traceStep) {
            $functionName = isset($traceStep['class'])
                ? ($traceStep['class'] . $traceStep['type'] .
$traceStep['function'])
                : $traceStep['function'];
            $fileInfo = isset($traceStep['file']) ?
basename($traceStep['file']) : '';
            $metaIdParts[ ] = $fileInfo . ':' . $functionName;
        }
    }
    return md5(join(';', $metaIdParts));
}
```

APPENDIX ii

```
/**
 * Get exception message w/o identifiers, paths or other variable specific information
 *
 * @param string $message
 * @return string
 */
private static function _getStrippedMessage($message)
{
    $message = trim($message);
    $message = str_replace(array('\\', '""'), array('/', '"'), $message);
    $message = preg_replace('|//+|', '/', $message);
    $message = preg_replace('/[a-f0-9]{8}-[a-f0-9]{4}-[a-f0-9]{4}-[a-f0-9]{4}-[a-f0-9]{12}/i', '*guid*', $message);
    $message = preg_replace('/[a-f0-9]{32}/i', '*hash*', $message);
    $message = preg_replace('|([a-zA-Z]:)?/([ /]+/+)+([\w\.]+\.\w{2,4})|', '/path/\\3', $message);
    $message = preg_replace('#(/opt/psa/|/usr/local/psa/)#', '/*psa*/', $message);
    $message = preg_replace('|[a-zA-Z]:/.*?/Parallels/Plesk/|', '/*psa*/', $message);
    $message = preg_replace('/("-{1,2}[_=]+?)=[ "]+?(")/', '\1=*param*\2', $message);
    $message = preg_replace('/("-{1,2}[ "]+?") "[ -"][ "]+?"/', '\1 "*param*"', $message);
    $message = preg_replace('/\d{11}\.\d{8}/', '*microtime*', $message);
    $message = preg_replace('/\d+/', '*number*', $message);
    return $message;
}
```

What is claimed is:

1. A system for processing and fixing run-time errors, the system comprising:

a computer system processor configured to generate run-time error messages including generic error data and error data specific to the computer system;

a database configured to store error codes and corresponding human-readable articles for fixing the errors associated with the error codes; and an error detection module configured to detect error messages and provide visual representation of an error on a user monitor, wherein the error message data specific to the computer system is encrypted, and wherein:
  a server receives the error message and queries the database for human-readable articles corresponding to the error message and fills out the human-readable article based on the error data specific to the computer system; and
  the computer system receives the human-readable article, decrypts the error data and applies the human-readable article to the error.

2. A computer-implemented system for run-time error message handling in a web hosting environment, the system comprising:
  a processor;
  a memory coupled to the processor;
  a web-hosting application stored in the memory and executed on the processor, wherein the web-hosting application is configured for remote administration from a user computer; and
  a run-time error processing module running within the web-hosting application and configured to:
    detect a run-time error with an original error message,
    generate a stripped error message,
    generate a hash value metaID by hashing a file name, a name of a method and a code line inside the method where the run-time error occurred, and
    generate a hash value messageID by hashing the stripped error message,
    wherein the web-hosting application is configured to receive instructions for handling the run-time error based on articles found in a remote knowledge database searched by any of:
      the metaID;
      the message ID; and
      the stripped error message.

3. The system of claim 2, wherein the run-time error processing module is configured to acquire web server configuration data and encrypt the web server configuration data.

4. The system of claim 2, wherein the run-time error processing module is configured to send a URL of knowledge database, the stripped error message, the metaID and the messageID upon detection of the run-time error.

5. The system of claim 2, wherein the stripped error message is generated by processing an original error message corresponding to a type of the run-time error.

6. The system of claim 2, wherein the run-time error processing module is configured to collect security policy system configurations associated with the run-time error.

7. The system of claim 6, wherein the web-hosting application is configured to receive updated security policy configurations from a server connected to the knowledge database.

8. A computer-implemented method for run-time error handling in web hosting environment, the method comprising:
  detecting a run-time error;
  generating an original error message;
  forming a stripped error message;
  generating a hash value metaID;
  generating a hash value messageID;
  sending an error notification to a web-hosting administrator, wherein the error notification contains a URL of a knowledge database, the stripped error message, the metaID and the messageID;
  acquiring system configuration and encrypting the configuration data;
  searching an article for handling the run-time error in the knowledge database by the metaID and by the messageID;
  selecting an article based on the configuration data; and
  receiving the article for handling the run-time error from the knowledge database, wherein:
    the metaID is generated by hashing a file name, a method and a code string within the method where the run-time error is detected; and
    the messageID is generated by hashing the stripped error message.

9. The method of claim 8, further comprising sending the error handling article to a web-hosting administrator.

10. The method of claim 8, further comprising searching the article for handling the run-time error in the knowledge database by the stripped error message, if no article is found by searching by the metaID and by the messageID.

11. The method of claim 8, further comprising generating an error ticket containing description of the error, if the article is not found in the knowledge database.

12. The method of claim 11, further comprising generating an article based on the error ticket and storing it in the knowledge database.

13. The method of claim 8, further comprising collecting security configurations of the web hosting system associated with the run-time error.

14. The method of claim 13, further comprising assigning a vulnerability rating to the security configurations based on run-time error statistics.

15. The method of claim 14, further comprising providing security configuration updates if the vulnerability rating exceeds a threshold.

16. The method of claim 8, further comprising calculating a frequency of error occurrences based on the stripped error message, the metaID and the messageID.

17. The method of claim 16, further comprising updating security configurations of the web hosting system based on the frequency of the error occurrences.

* * * * *